United States Patent
Ahman et al.

(10) Patent No.: US 7,972,399 B2
(45) Date of Patent: Jul. 5, 2011

(54) FABRIC FILTER WITH FLUIDISED DUST-BED, AND A METHOD OF MAINTAINING IT

(75) Inventors: Stefan Ahman, Vaxjo (SE); Nils Bringfors, Stockholm (SE)

(73) Assignee: ALSTOM Technology Ltd, Baden (CH)

( * ) Notice: Subject to any disclaimer, the term of this patent is extended or adjusted under 35 U.S.C. 154(b) by 454 days.

(21) Appl. No.: 12/084,924

(22) PCT Filed: Dec. 12, 2006

(86) PCT No.: PCT/SE2006/001412
§ 371 (c)(1),
(2), (4) Date: May 13, 2008

(87) PCT Pub. No.: WO2007/073277
PCT Pub. Date: Jun. 28, 2007

(65) Prior Publication Data
US 2009/0266234 A1  Oct. 29, 2009

(30) Foreign Application Priority Data
Dec. 22, 2005  (SE) ........................................ 0502856

(51) Int. Cl.
*B01D 46/02* (2006.01)
*B01D 46/44* (2006.01)
(52) U.S. Cl. .............. 55/341.6; 55/431; 55/484; 95/278; 95/286
(58) Field of Classification Search .................... 95/286, 95/278; 55/341.1, 341.5, 341.6, 428, 430, 55/484, 431
See application file for complete search history.

(56) References Cited

U.S. PATENT DOCUMENTS

| | | | |
|---|---|---|---|
| 4,292,053 A | | 9/1981 | Remillieux |
| 4,336,035 A | * | 6/1982 | Evenstad et al. ................. 95/286 |
| 4,376,638 A | * | 3/1983 | Dunseith .......................... 95/286 |
| 5,178,652 A | | 1/1993 | Huttlin |
| 5,198,002 A | * | 3/1993 | Mei et al. ......................... 95/275 |
| 5,591,240 A | | 1/1997 | Ophardt et al. |
| 5,868,807 A | | 2/1999 | Luy et al. |
| 7,300,481 B2 | * | 11/2007 | Scheuch .......................... 55/302 |

FOREIGN PATENT DOCUMENTS

| | | |
|---|---|---|
| EP | 0053943 | 6/1982 |
| EP | 0467745 | 1/1992 |
| EP | 0299898 | 1/1998 |
| GB | 2088244 | 6/1982 |

OTHER PUBLICATIONS

PCT International Search Report (PCT/SE2006/001412) dated Mar. 23, 2007.

* cited by examiner

*Primary Examiner* — Robert A Clemente
(74) *Attorney, Agent, or Firm* — Rita D. Vacca

(57) ABSTRACT

A fabric filter (1) has at least a first compartment (2) and a second compartment (4). A hopper (42) is adapted for fluidisation of dust collected in the compartments (2, 4) to form a bed (52) of fluidised dust. A partition wall (62) is located between the compartments (2, 4) to separate them from each other. A passage (68) is formed at a lower end (66) of the partition wall (62) such that fluidised dust may pass through said passage (68). The partition wall (62) is arranged to extend into the bed (52) of fluidised dust for forming a seal (74) even when one of the compartments (2, 4) has been shut off. When shutting off a compartment (4) the inlets and outlets to that compartment (4) are closed and the dust in the hopper (42) is fluidised to provide a seal (74) between the compartments (2, 4).

11 Claims, 6 Drawing Sheets

FABRIC FILTER WITH FLUIDISED DUST-BED, AND A METHOD OF MAINTAINING IT

TECHNICAL FIELD

The present invention relates to a fabric filter having at least a first compartment and a second compartment, the first compartment being provided with a first inlet for dust-laden gas, at least one fabric filtering unit through which the dust-laden gas may be filtered and a first outlet for cleaned gas, the second compartment being provided with a second inlet for dust-laden gas, at least one fabric filtering unit through which the dust-laden gas may be filtered and a second outlet for cleaned gas, the fabric filter further comprising a hopper located below the compartments for collecting dust collected in the first and the second compartments.

The invention also relates to a method of shutting off a compartment in a fabric filter, having at least two compartments and operating to clean a dust-laden gas, for maintenance work while another compartment of said fabric filter is still in operation.

BACKGROUND ART

Fabric filters, sometimes called bag-houses, are often used for separating dust particles from a dust-laden gas, such as a flue gas of a coal-fired boiler, a waste incinerator plant, an electric arc furnace or another process in which a dust-laden gas is generated. U.S. Pat. No. 4,336,035 and EP 168 369 A2 describe typical fabric filters in which a dust-laden gas is passed into a housing. Inside the housing a number of textile filter bags are located. Each bag is supported by a wire cage such that a gas may pass through the textile material and into the bag leaving the dust on the outside of the bag. During operation the dust forms a cake on the outside of the bag. By intermittent high pressure pulsing the bag is forced to expand rapidly thereby removing the cake of dust from the bag. The dust is collected at the bottom of the housing.

U.S. Pat. No. 5,505,766 to Chang describes a bag-house having three parallel compartments. It is often desired to shut off one compartment in order to be able to inspect the bags of that compartment while the other compartments remain in operation. This would, however, require one shut off valve for the dust transport line of each compartment. Such a system is quite expensive both in investment and maintenance cost.

SUMMARY OF THE INVENTION

The object of the present invention is therefore to provide a fabric filter having at least two compartments, one of which could be shut off during operation of the fabric filter without the need for a separate dust valve in each compartment.

According to the invention, this object is achieved by a fabric filter having at least a first compartment and a second compartment, the first compartment being provided with a first inlet for dust-laden gas, at least one fabric filtering unit through which the dust-laden gas may be filtered and a first outlet for cleaned gas, the second compartment being provided with a second inlet for dust-laden gas, at least one fabric filtering unit through which the dust-laden gas may be filtered and a second outlet for cleaned gas, the fabric filter further comprising a hopper located below the compartments for collecting dust collected in the first and the second compartments, the fabric filter being characterised in that the hopper is adapted for fluidisation of the collected dust to form a bed of fluidised dust and comprises a fluidisation gas distributor, a partition wall being located between the first compartment and the second compartment to separate them from each other, a passage being formed at a lower end of the partition wall such that fluidised dust may pass through said passage, said partition wall being arranged to extend into the bed of fluidised dust for forming a seal even when one of the compartments is shut off.

An advantage of this fabric filter is that the dust transport may continue to be in operation also when one of the compartments is shut off and this regardless of which one of the compartments that is shut off. Thus there is no risk that a compartment becomes overfilled with dust. The inventive fabric filter thus avoids the necessity of having separate dust discharge systems for each compartment.

According to a preferred embodiment said passage is a gap formed between the fluidisation gas distributor and the lower end of the partition wall. An advantage of this embodiment is that the fluidised dust may easily pass through such a passage without any considerable resistance.

According to a preferred embodiment an opening is formed in the partition wall above the bed of fluidised dust. The opening provides an escape route of fluidising medium, such as air, from the bed of fluidised dust to the compartment that is still in operation. Thus contamination of the air inside the compartment that is shut off is avoided.

Preferably the first and second inlets are both located above the bed of fluidised dust. An advantage of this is that the dust is not agitated in an undesired way. Further, if the bed of fluidised dust is located below the inlets for gas, the dust does not have a negative effect on dampers provided in the respective inlets.

According to a preferred embodiment each of the compartments is provided with a dust level sensor for sensing that the bed of fluidised dust has a sufficiently high level for the proper functioning of the seal. An advantage of this is that the proper functioning of said seal may be ensured by controlling that the bed of fluidised dust has a sufficiently high level.

According to a preferred embodiment the compartments are adapted to operate at a pressure below the atmospheric pressure. An advantage of this is that any trace amounts of gas, such as flue gas or fluidising air, that reaches a shut off compartment, in which the pressure is more or less the same as ambient pressure, may be transferred, by suction, to the neighbouring compartment that is still in operation. Also the gas, such as flue gas, that is trapped inside the compartment at the shut off is evacuated into the neighbouring compartment. A further advantage is that any leakage in the structure of the fabric filter will lead to a leakage of ambient air into the fabric filter rather than the leakage of dust-laden gas out of the fabric filter. Still more preferably the compartments are adapted to operate at a pressure of at least 800 Pa below the atmospheric pressure. This has the advantage of quickly evacuating the shut off compartment and to make sure that the fluidising medium is effectively removed from the shut off compartment.

Preferably the fabric filter comprises at least three compartments being separated from each other by partition walls. An advantage of this is that when one compartment has been shut off there is still at least two-thirds of the filtering capacity available. In a filter having only two compartments shutting off one compartment means that the remaining compartment faces a gas flow that has increased by 100%. In most cases this is more than what a single compartment is designed for. In a filter having three or more compartments the shutting off of one compartment results in the increase in gas flow by only 50%, or less if there are more than three compartments, in each compartment still in operation. This is an increase which often can be handled in the design.

Another object of the present invention is to provide a simple and efficient method of shutting off one compartment of a fabric filter having at least two compartments.

This object is achieved by a method of shutting off a compartment in a fabric filter, having at least two compartments and operating to clean a dust-laden gas, for maintenance work while another compartment of said fabric filter is still in operation, the method being characterised in that the fabric filter is provided with a fluidised hopper and a partition wall separating a first compartment from a second compartment of the fabric filter, the partition wall having a lower end, a passage being formed at said lower end such that fluidised dust may pass through said passage, the method further comprising the steps of:

closing the inlet of dust-laden gas and the outlet of cleaned gas of the second compartment while keeping the inlet of dust-laden gas and the outlet of cleaned gas of the first compartment open, fluidising dust collected in the hopper to form a bed of fluidised dust which extends above said lower end of the partition wall even when the second compartment is shut off such that the bed of fluidised dust forms a seal, and opening a maintenance hatch in the second compartment such that the second compartment may be accessed.

An advantage of this method is that it provides easy access to the interior of a fabric filter compartment without requiring a complicated fabric filter design and without necessitating an interruption in the outflow of dust from the fabric filter.

According to a preferred embodiment the dust is fluidised to such a degree that the density of the fluidised dust is 400-1500 kg/m$^3$. An advantage of this embodiment is that the fluidised dust in this condition provides an efficient seal between the shut off compartment and that compartment which is still in operation.

Additional advantages and features of the invention will be evident from the following description and the appended claims.

BRIEF DESCRIPTION OF THE DRAWINGS

The invention will now be described in more detail by way of preferred embodiments and with reference to the accompanying drawings.

DESCRIPTION OF PREFERRED EMBODIMENTS

Figure 1:
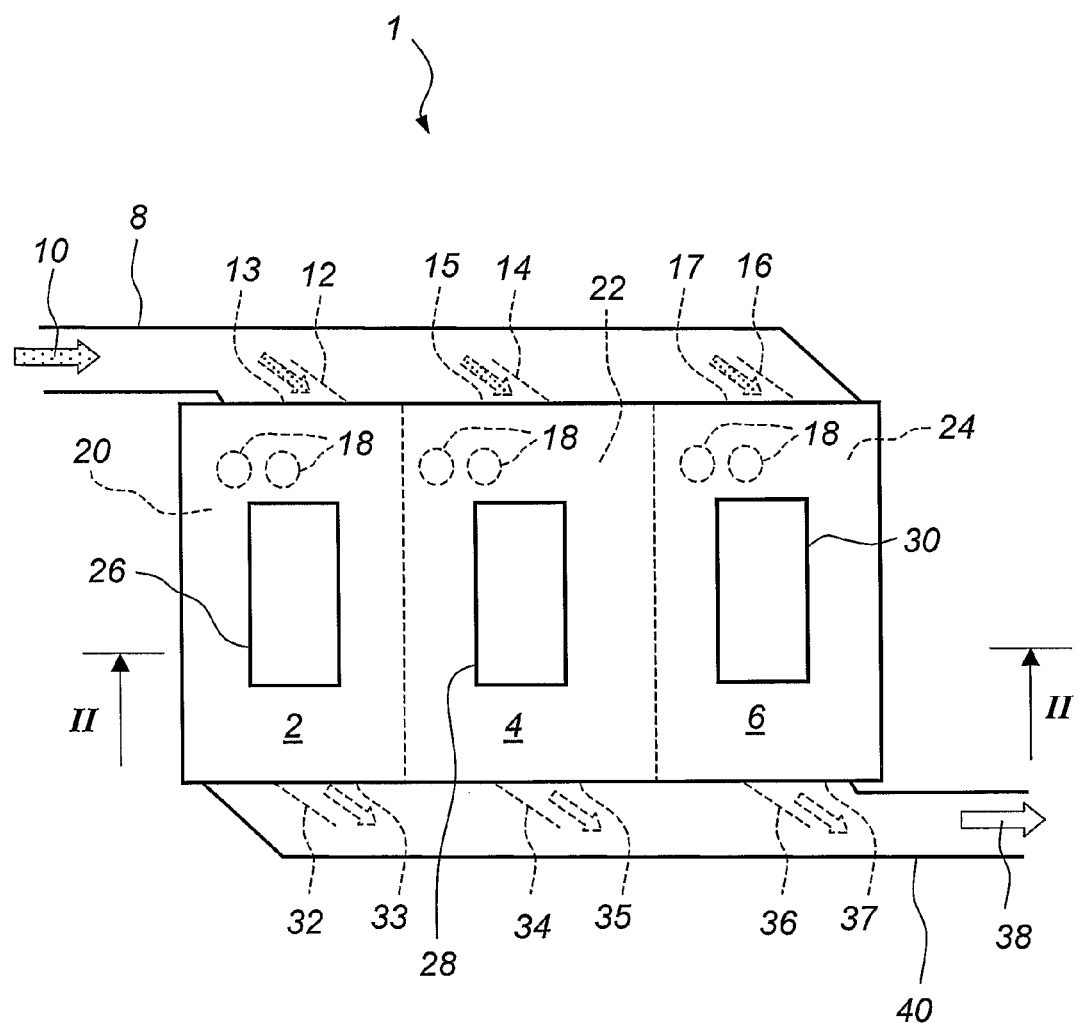
FIG. 1 is a schematic top view and shows a fabric filter according to the invention as seen from above.
Figure 2:
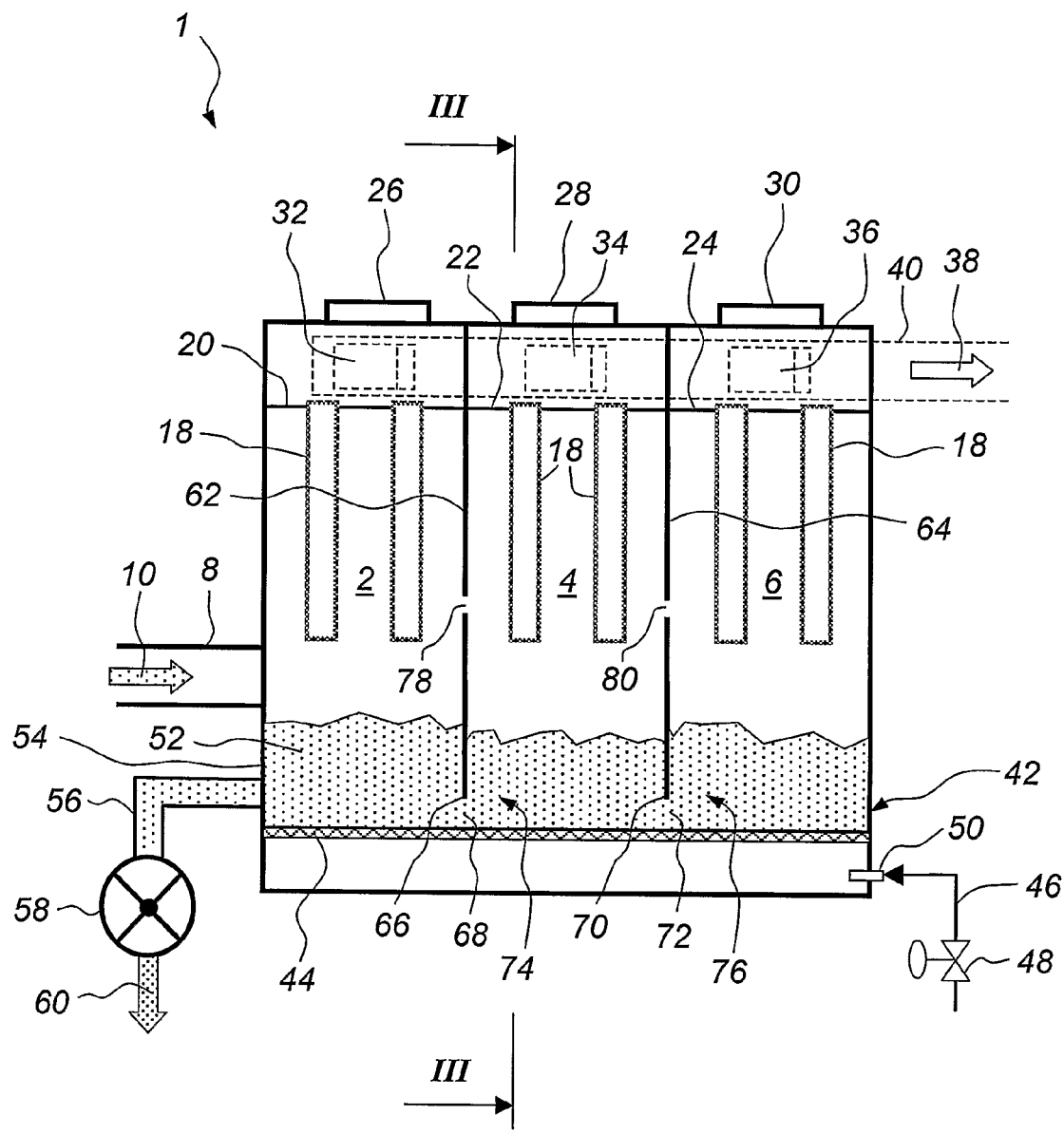
FIG. 2 is a schematic section view and shows the fabric filter as seen along the section II-II of FIG. 1.
Figure 3:
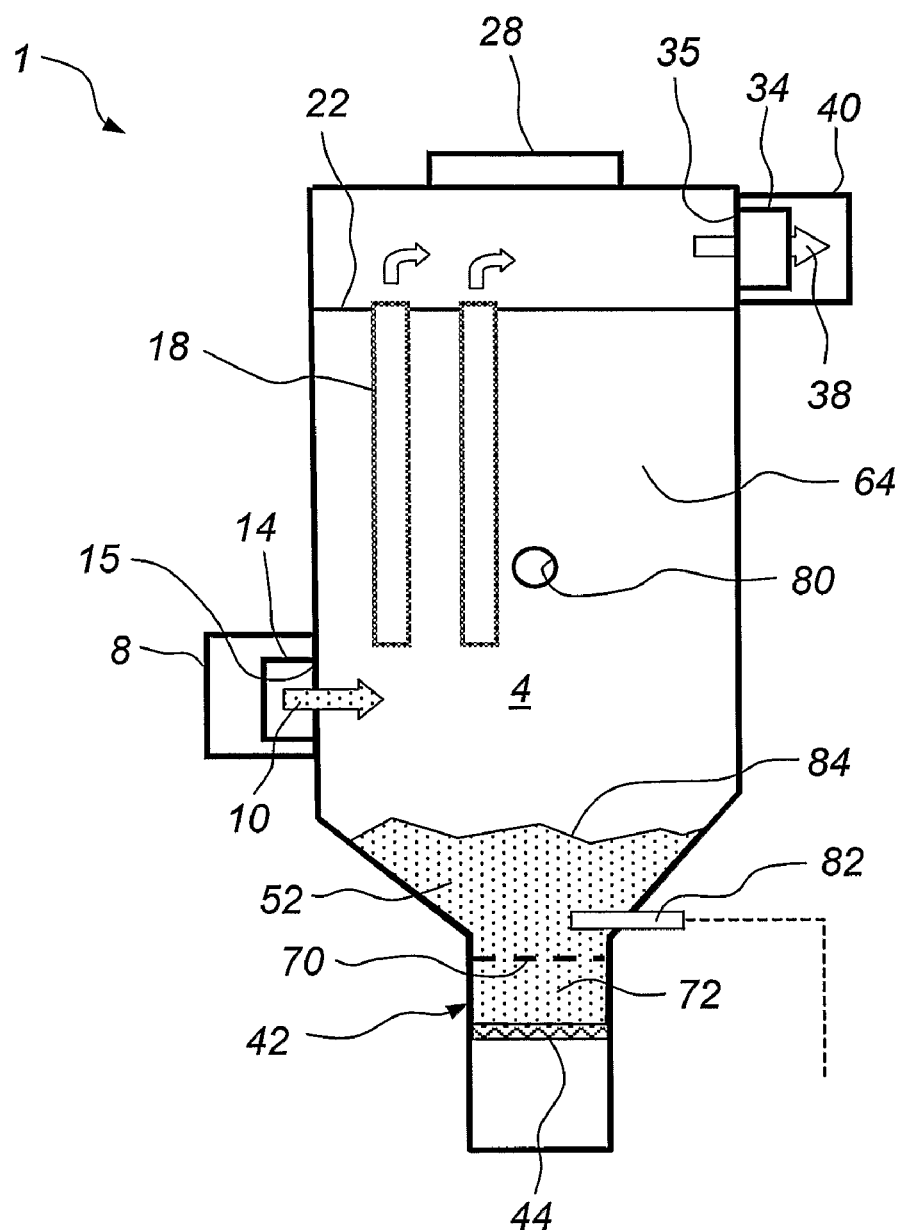
FIG. 3 is a schematic section view and shows the fabric filter as seen along the section III-III of FIG. 2.

FIG. 1, FIG. 2 and FIG. 3 show, schematically, a fabric filter 1 according to the invention. The fabric filter 1 is divided in a first compartment 2, a second compartment 4 and a third compartment 6. In the occasion shown in FIGS. 1-3 all three compartments 2, 4, 6 are in operation.

FIG. 1, being a top view, shows that the fabric filter 1 has an inlet duct 8 for dust-laden flue gas 10 from a boiler (not shown). Each compartment 2, 4, 6 is provided with an inlet damper 12, 14, 16 for controlling the inlet of flue gas 10 into that particular compartment via a first inlet 13, a second inlet 15 and a third inlet 17, respectively. Each compartment 2, 4, 6 is provided with a plurality of fabric filtering units in the form of fabric filter bags 18. It will be appreciated that although only two filter bags 18 are shown in each compartment the number of filter bags is often in the range of 20-2000 bags per compartment. Each compartment has a hole plate 20, 22, 24 in which the filter bags 18 are mounted, thereby forcing the dust-laden gas to pass through the fabric of the filter bags resulting in the removal of dust from the gas. The filtering principle is similar to that described in U.S. Pat. No. 4,336,035 and EP 168 369 A2, which are hereby included by this reference, and will not be described in detail.

Each compartment 2, 4, 6 is provided with a maintenance hatch 26, 28, 30 enabling the access to the filter bags 18 for maintenance and repair. Each of the compartments 2, 4, 6 is provided with an outlet damper 32, 34, 36 for controlling the outlet of cleaned gas 38 from that particular compartment via a first outlet 33, a second outlet 35 and a third outlet 37, respectively. The cleaned gas 38 is forwarded to a stack or subsequent gas treatment processes, not shown, via a clean gas outlet duct 40. At the end of the clean gas duct 40 a suction fan, not shown, is placed. The suction fan makes the fabric filter 1, and thus the compartments 2, 4, 6 operate at a pressure below the atmospheric pressure, typically at a pressure of about 800-5000 Pa below atmospheric pressure.

FIG. 2 is a cross-sectional view and shows the fabric filter 1 as seen from the side and with a hopper 42 arranged to collect the dust that is collected on the filter bags 18. The removal of the dust from the filter bags 18 may be made by various methods, such as by pulsing with pressurized air, as is described in U.S. Pat. No. 4,336,035 and EP 168 369 A2.

The hopper 42 is provided with a fluidisation gas distributor in the form of a horizontal fluidisation cloth 44. A pipe 46 for the supply of a fluidisation medium in the form of pressurized air, the amount of which being controllable by means of a valve 48, is connected to an inlet 50 located below the level of the cloth 44. The pressurized air fluidises the collected dust to form a bed 52 of fluidised dust in the hopper 42. At one end 54 of the hopper 42 a dust outlet duct 56 is located. The dust outlet duct 56 is connected to a rotary discharger 58. The rotary discharger 58 forwards a flow 60 of collected dust from the bed 52 to a dust silo, not shown in FIG. 2.

As is shown in FIG. 2 the first compartment 2 is separated from the second compartment 4 by means of a first partition wall 62. The second compartment 4 is separated from the third compartment 6 by a means of a second partition wall 64. The first partition wall 62 has a lower end 66 which extends into the bed 52 of fluidised dust. Between the lower end 66 and the cloth 44 a passage in the form of a gap 68 is formed. The second partition wall 64 has a lower end 70 which extends into the bed 52 of fluidised dust. Between the lower end 70 and the cloth 44 a gap 72 is formed. The height of the gaps 68 and 72 is typically about 5-30 cm, i.e. the distance between the respective lower end 66, 70 and the cloth 44 is about 5-30 cm. The horizontal width of the gaps 68, 72 is adapted for the size of the fabric filter 1 in question.

In normal operation dust is removed from the inlet dust-laden gas in all three compartments 2, 4, 6 by means of filtering the gas through the filter bags 18. By e.g. pulsing by means of pressurized air the collected dust is intermittently removed from the filter bags 18 and joins the bed 52 of fluidised dust below the respective compartment 2, 4, 6. The fluidised dust will have properties similar to those of a liquid and will flow in a manner similar to that of a liquid. Thanks to the gap 72 the fluidised dust from the third compartment 6 will flow to a position under the second compartment 4. Thanks to the gap 68 the dust from the third and second compartments 6, 4 will flow further to a position below the first compartment 2. The fluidised dust will then, finally, leave the hopper 42 via the dust outlet duct 56 and the rotary discharger 58. Thus one rotary discharger 58 is sufficient for emptying the collected dust from all three compartments 2, 4, 6. Since the partition walls 62, 64 extend into the bed 52 of fluidised dust seals 74, 76 are formed that prevent the transport of dust-laden gas between the compartments 2, 4, 6. The seals 74, 76 formed by the partition walls 62, 64 together with the bed 52 of fluidised dust will have a function similar to that of a water seal in functioning to prevent gas from flowing from one compartment to another, the fluidised dust having a function similar to that of water in this respect.

Each partition wall 62, 64 is provided with a small opening 78, 80. The openings 78, 80 are located above the bed 52 of fluidised dust but below the level of the hole plates 20, 22, 24. The openings 78, 80, the size of which depends on the size of the compartment and the amount of fluidising air, are used to evacuate the fluidising air during shut-offs, as will be described below.

FIG. 3 is a cross-sectional view of the fabric filter 1 as seen from the side in the direction III-III indicated in FIG. 2. The compartment 4 is provided with a fluidised dust level sensor 82, sending signals to a not shown control system, in order to ensure that the upper level 84 of the bed 52 of fluidised dust is always located above the lower end 70 of the partition wall 64. The sensor 82 could be of a capacitive level sensor type, of a floating body type or of some other suitable type.

As can be seen the inlet duct 8 and the inlet damper 14 of the second compartment 4 are located at a level which is above the upper level 84 of the bed 52 of fluidised dust in order to avoid having the inlet flue gas 10 stir around the bed 52 of fluidised dust and to avoid that fluidised dust leaks through the inlet damper 14 both in normal operation and when the compartment 4 is shut off, as will be described below.

Figure 4:
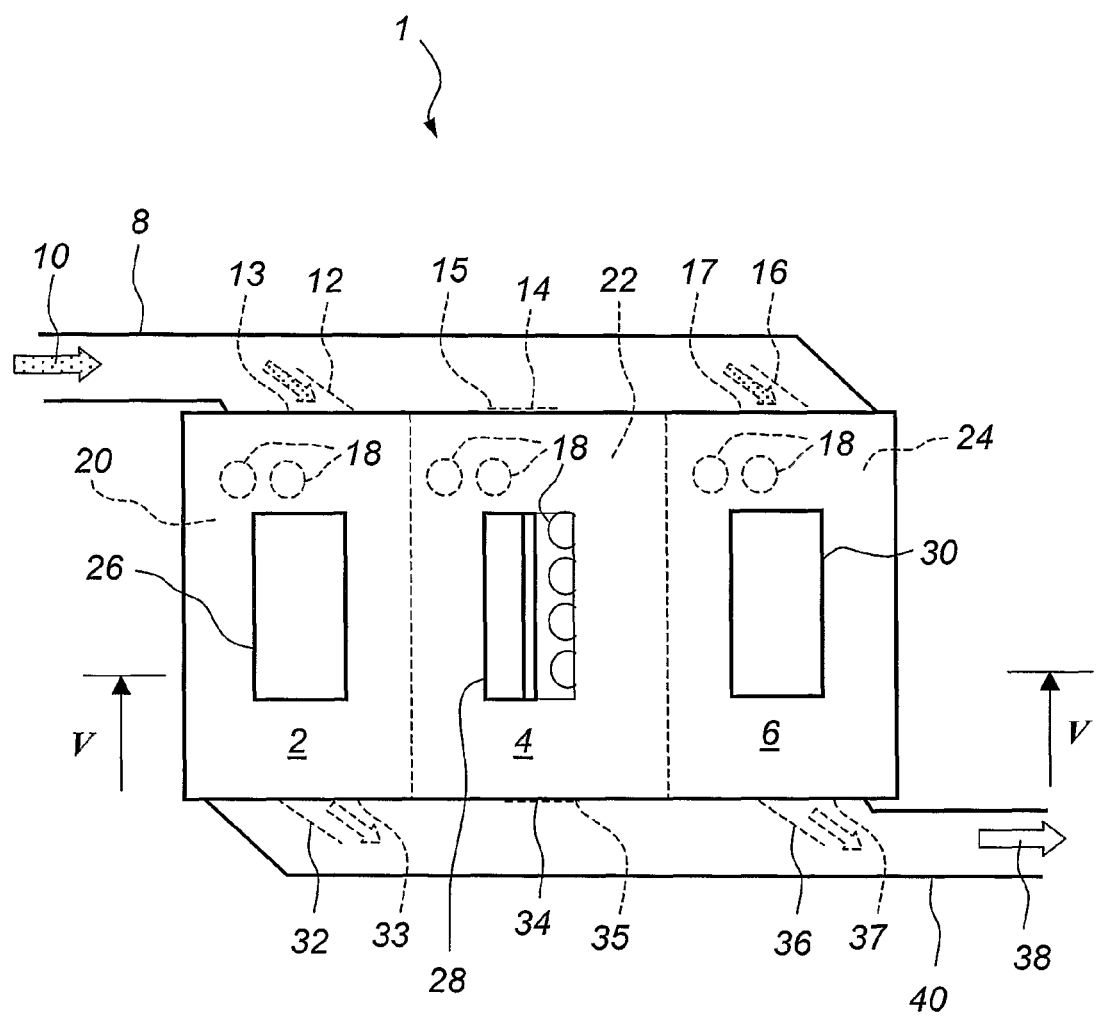
FIG. 4 is a schematic top view and shows the fabric filter according to the invention as seen from above when one compartment has been shut off.
Figure 5:
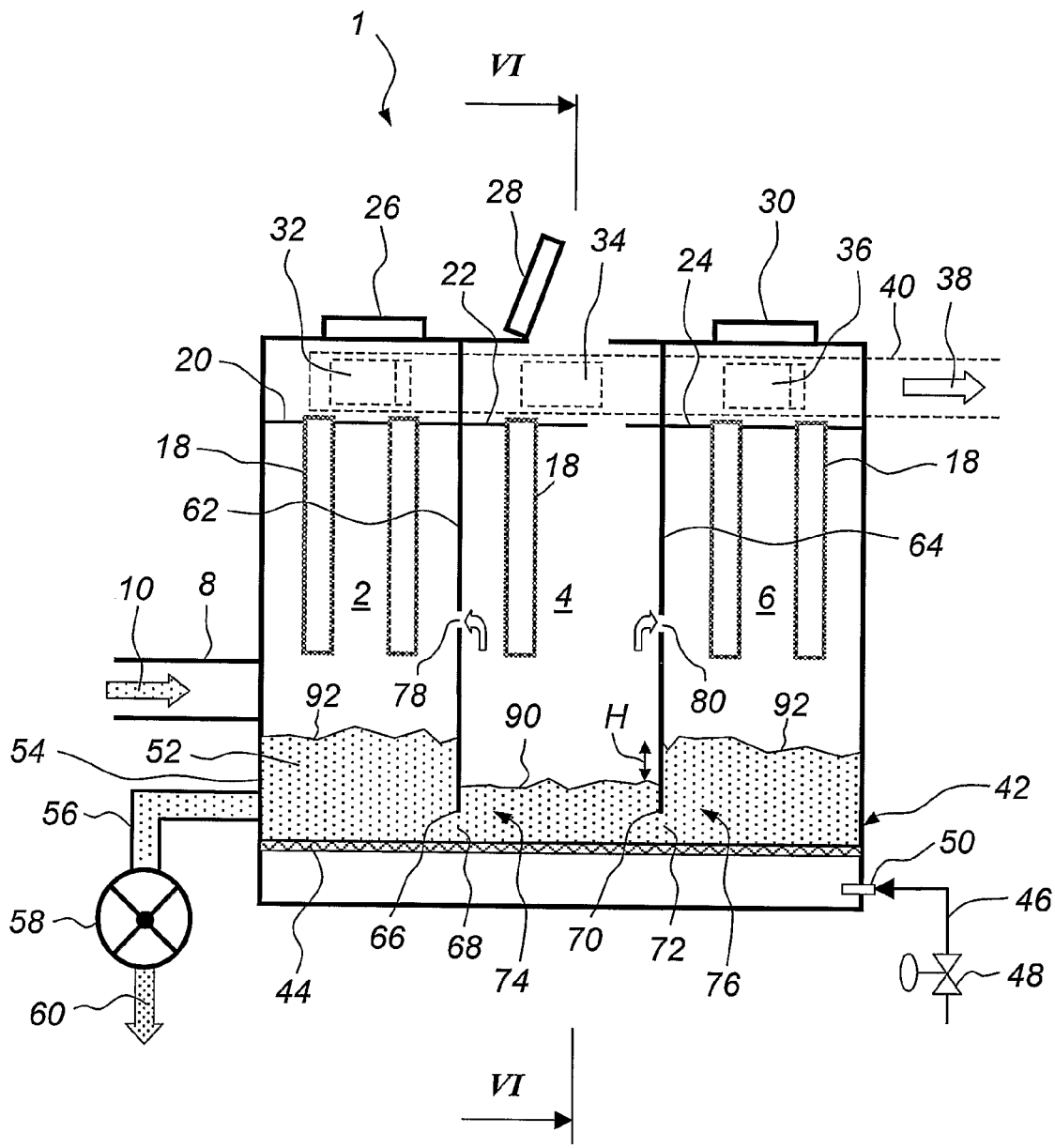
FIG. 5 is a schematic section view and shows the fabric filter as seen along the section V-V of FIG. 4.
Figure 6:
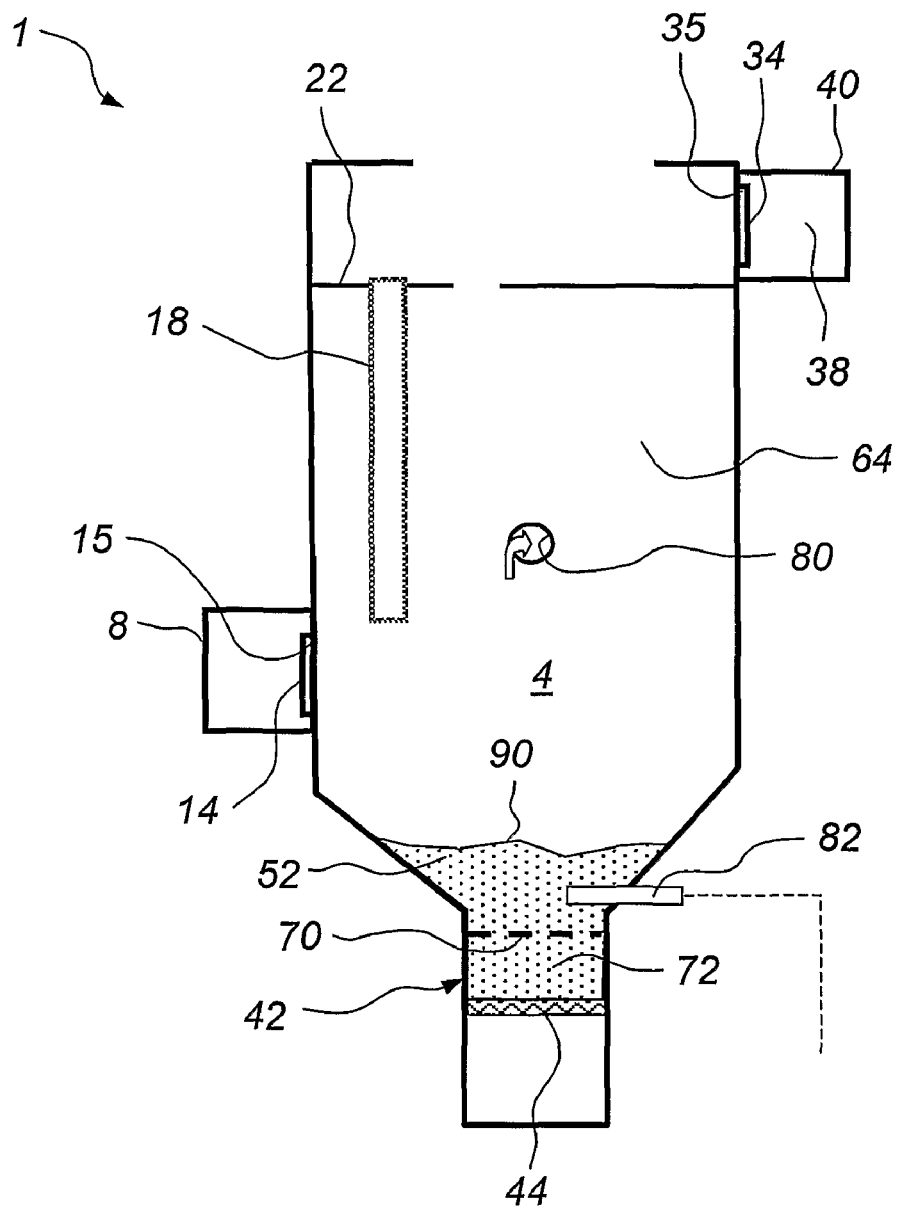
FIG. 6 is a schematic section view and shows the fabric filter as seen along the section VI-VI of FIG. 5.

FIG. 4, FIG. 5 and FIG. 6 show the fabric filter 1 after the second compartment 4 has been shut off.

FIG. 4 illustrates that the inlet damper 14 and the outlet damper 34 have been shut. Thus the second inlet 15 and the second outlet 35 have been closed. Thus the inlet flue gas 10 has to enter the first and third compartments 2, 6. The cleaned outlet gas 38 leaves the compartments 2, 6 via the outlet dampers 32, 36 and leaves the fabric filter 1 via the outlet duct 40. The hatch 28 of the second compartment 4 has been opened leaving the filter bags 18 available for inspection. Since the maintenance hatch 28 is open the pressure inside the second compartment 4 is close to atmospheric while the pressure in the first and third compartments 2, 6 is still below atmospheric pressure. Thus the pressure in the first and third compartments 2, 6 is lower than the pressure in the second compartment 4.

FIG. 5 is a cross-sectional view and illustrates, as seen from the side, how the bed 52 of fluidised dust is affected by the second compartment 4 being shut off. As can be seen the bed 52 has a level 90 in the second compartment 4 which is lower than a level 92 prevailing in the first and third compartments 2, 6. The reason for the level 90 in the shut off second compartment 4 being lower is that the pressure is higher in the second compartment 4 than in the first and third compartments 2, 6, as is described above. The higher pressure in compartment 4 means that the fluidising air cannot build the same height for the bed 52 in this area. The difference in height H between the level 90 and the level 92 depends on the difference in pressure between the shut off compartment 4 and the compartments 2, 6 still being in operation. Typically the height H is 5-100 cm, depending on the type of dust, the degree of fluidisation and the pressure difference between compartment 4 and the compartments 2 and 6.

As is shown in FIG. 5 the lower end 66 of the first partition wall 62 and the lower end 70 of the second partition wall 64 are both located below the level 90 of the bed 52, and, naturally, below the level 92. Thus the seals 74 and 76 will still function to prevent gas from leaking between shut off compartment 4 and the compartments 2, 6 still being in operation.

Due to the gaps 68 and 72, the transport of collected dust is still in operation. Thanks to the gap 72 the fluidised dust from the third compartment 6 will flow to a position under the second compartment 4. Thanks to the gap 68 the dust from the third compartment 6 will then flow further to a position below the first compartment 2. The fluidised dust will then, finally, leave the hopper via the dust outlet duct 56 and the rotary discharger 58. Thus the fact that the second compartment 4 is shut off does not affect the transport of collected dust from the first and third compartments 2, 6.

The fluidisation of the dust in the bed 52 of fluidised dust results in the emission of a minor amount of spent fluidisation medium, such as spent pressurized air, emanating from the bed 52, in the second compartment 4. Since the pressure is lower in the compartments 2 and 6 than in compartment 4 the spent fluidisation medium will leave the second compartment 4 via the small openings 78, 80 in the partition walls 62, 64, respectively, as is indicated by arrows in FIG. 5, and will then be mixed with the flue gas in the compartments 2 and 6. It will be appreciated that the openings 78, 80 are sufficiently small to avoid a large dilution by ambient air and to avoid any dust in the compartments 2, 6 from accidentally entering the shut off compartment 4. Typically the openings 78, 80 are designed to provide a gas velocity of about 5-15 m/s at the pressure differences in question. It will further be appreciated that the closed outlet damper 34 needs to have a fairly tight sealing to avoid that the fluidisation medium, and even flue gas from the compartments 2, 6, is sucked through the hole plate 22 and into the outlet duct 40.

FIG. 6 shows the second compartment 4 of the fabric filter 1 after this compartment 4 has been shut off. As can be seen, when comparing with FIG. 3, the level 90 of the bed 52 of fluidised dust is considerably lower than the level 84 that exists when the second compartment 4 is in operation. The level 90 is still above the lower end 70 of the partition wall 64 and thus the bed 52 still functions as a seal. The fluidised dust level sensor 82 is still covered by the bed 52 and thus the level 90 is sensed as sufficiently high. If the level 90 would decrease below the sensor 82 an alarm could be given to a not shown control system. The level 90 could then be increased by increasing the amount of fluidising medium supplied to the hopper 42 or by decreasing the outflow of dust via the rotary discharger 58.

In this shut off state the compartment 4 may be maintained. For example a person could stand on the hole plate 22 and inspect the filter bags 18 and replace those that are defective. As shown in FIGS. 5 and 6 one of the filter bags 18 of compartment 4 has been removed for inspection and possible replacement.

The method of shutting off a compartment comprises the following steps: the inlet and outlet dampers belonging to that compartment which is to be shut off are closed. Thus the inlet of dust-laden gas and the outlet of clean gas is stopped for that compartment. The fluidisation of the dust in the hopper 42 is kept in operation. If, for some reason, the fluidisation has been deactivated it is now, at the latest, started in order to obtain a bed 52 of fluidised dust into which the lower ends 66, 70 of the partition walls 62, 64 extend to form the seals 74, 76. Finally the hatch of the compartment in question is opened such that the shut off compartment can be maintained. It will be appreciated that the vertical extension of the bed 52 of fluidised dust is preferably adjusted, prior to opening the hatch, in such manner that the lower end 66, 70 of the respective partition wall 62, 64 will be located inside the bed 52 even after the hatch has been removed.

It will be appreciated that many variations of the above described embodiments are possible within the scope of the appended claims.

For example the above fabric filter comprises three compartments. It will be appreciated that, in an alternative embodiment, the fabric filter could be designed with only two compartments, separated by a single partition wall. In still another embodiment the fabric filter could be designed with four, or more, compartments separated from each other by partition walls of the type described above.

In FIGS. 4-6 it is illustrated how the second compartment 4 is shut off. It will be appreciated that any one of the compartments could be shut off, while keeping the other compartments as well as the dust transport in operation. It is even possible to simultaneously shut off two compartments while keeping only one compartment in operation. The latter alternative is preferably only done when operating a boiler, or another gas generating unit as the case may be, at part load since the entire gas flow needs to be filtered through one compartment.

Above it is described that small openings 78, 80 are formed in the partition walls to allow the fluidisation medium from the bed of fluidised dust to escape from the compartment which is presently shut off and under maintenance to the compartments still in operation. It will be appreciated that other solutions are possible as well. According to one embodiment the inlet dampers are deliberately made to have some leakage. That way the fluidisation medium will leak through the inlet damper of the shut off compartment and will be sucked into the compartments being in operation via the inlet ducts and the inlet dampers of those compartments.

Above it is described that the fluidised dust of the bed 52 passes the partition walls 62, 64 via passages having the form of gaps 68, 72. It will be appreciated that other types of passages could also be used. For instance a passage in the form of one or several apertures formed in a partition wall, at a lower end thereof, could be used for allowing the fluidised dust to pass the partition wall. In such a case it is important that the entire aperture/-s is/are located in the bed of fluidised dust, i.e. below the level 90 of the bed 52 of fluidised dust.

In FIG. 3 it is shown that the lower end of the partition wall is a straight, horizontal edge. It will be appreciated that the lower end could have other shapes as well, for instance some type of smooth or rounded curve. Any shape is possible as long as the entire lower end of the partition wall extends into the bed of fluidised dust.

In the embodiment shown in FIGS. 1-6 the dust collected in the hopper 42 is always fluidised, i.e. the dust is fluidised both when all compartments 2, 4, 6 are in operation and when one compartment is shut off. It is, in an alternative embodiment, also possible to operate the hopper such that the dust is only fluidised when one compartment is shut off, but not when all compartments are in operation. When all compartments are in operation there is no need for a seal and thus the bed 52 of fluidised dust is not a necessity. The dust may then be removed from the hopper by e.g. screw feeders located above the fluidisation cloth. When a compartment is to be shut off the valve controlling the fluidising medium is first opened in order to fluidise the material at the bottom of the hopper to form a bed of fluidised dust and to obtain the seals between the compartments. When the bed of fluidised dust has been established, and the seals thus being in function, the hatch may be opened. In most cases, however, it is preferred to have the dust fluidised both when all compartments are in operation and when one compartment is shut off.

Above the invention is described in relation to a fabric filter having filter bags hanging down from a hole plate located in an upper portion of the fabric filter, the bags being adapted for collecting dust on their outer surface. The present invention is also applicable to other types of fabric filters. For instance the invention is also applicable to fabric filters in which the filter bags extend upwards from a hole plate located in a lower portion of a filter house, a filtering principle which is described in U.S. Pat. No. 4,465,497 to Howeth. In that type of fabric filter the dust is collected at the inner surface of filter bags and is then, by back-flushing, made to fall down into a hopper.

The description above refers to a fluidisation gas distributor in the form of a fluidisation cloth. It will be appreciated that other types of fluidisation gas distributors may be used as well, such as perforated metal sheets, sintered plates, sintered nets, sintered ceramics etc. Preferably the cloth, sheet, plate, or net is placed horizontally in the hopper.

The invention claimed is:

1. A fabric filter comprising: at least a first compartment and a second compartment, the first compartment provided with a first inlet for dust-laden gas, at least one fabric filtering unit through which the dust-laden gas may be filtered and a first outlet for cleaned gas, the second compartment provided with a second inlet for dust-laden gas, at least one fabric filtering unit through which the dust-laden gas may be filtered and a second outlet for cleaned gas; a hopper located below the compartments for collecting dust collected in the first and the second compartments for fluidisation of the collected dust to form a bed of fluidised dust, with a fluidisation gas distributor; a partition wall located between the first compartment and the second compartment to separate them from each other; a passage formed at a lower end of the partition wall such that fluidised dust may pass through said passage, with said partition wall arranged to extend into the bed of fluidised dust for forming a seal even when one of the compartments is shut off; and an opening in the partition wall above the bed of fluidised dust.

2. A fabric filter according to claim 1, wherein said passage is a gap formed between the fluidisation gas distributor and the lower end of the partition wall.

3. A fabric filter according to claim 1, wherein the first and second inlets are both located above the bed of fluidised dust.

4. A fabric filter according to claim 1, wherein each of the compartments is provided with a dust level sensor.

5. A fabric filter according to claim 1, wherein the compartments operate at a pressure below atmospheric pressure.

6. A fabric filter according to claim 1, wherein each compartment is provided, at its upper portion, with a hole plate in which a plurality of filter bags are arranged, the filter bags extending from the hole plate down to a position above the bed of fluidised dust.

7. A fabric filter according to claim 1, wherein the fabric filter comprises at least three compartments separated from each other by partition walls.

8. A method of shutting off a compartment in a fabric filter comprising:

closing an inlet for dust-laden gas and an outlet for cleaned gas of a second compartment while maintaining an inlet for dust-laden gas and an outlet for cleaned gas of a first compartment open, fluidising dust collected in a hopper to form a bed of fluidised dust which extends above a lower end of a partition wall even when the second compartment is shut off such that the bed of fluidised dust forms a seal, and opening a maintenance hatch in the second compartment such that the second compartment may be accessed.

9. A method according to claim 8, wherein the dust is fluidised to such a degree that the density of the fluidised dust is 400-1500 kg/m3.

10. A method according to claim 8, wherein the first compartment is operated at a pressure below the atmospheric pressure.

11. A method according to claim 10, wherein gas is allowed to pass from the second compartment to the first compartment after the second compartment has been shut off.

* * * * *